US011739165B2

(12) United States Patent
Noguchi et al.

(10) Patent No.: US 11,739,165 B2
(45) Date of Patent: Aug. 29, 2023

(54) PHOSPHORIC ACID-ESTERIFIED FINE CELLULOSE FIBER AND METHOD FOR PRODUCING THE SAME

(71) Applicant: OJI HOLDINGS CORPORATION, Tokyo (JP)

(72) Inventors: Yuichi Noguchi, Tokyo (JP); Yasutomo Noishiki, Tokyo (JP); Ikue Homma, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 161 days.

(21) Appl. No.: 17/333,791

(22) Filed: May 28, 2021

(65) Prior Publication Data

US 2021/0284755 A1    Sep. 16, 2021

Related U.S. Application Data

(62) Division of application No. 14/891,255, filed as application No. PCT/JP2014/063024 on May 16, 2014, now Pat. No. 11,053,324.

(30) Foreign Application Priority Data

May 16, 2013    (JP) ................................. 2013-103626

(51) Int. Cl.
    *C08B 5/00*      (2006.01)
    *D21H 13/06*     (2006.01)
    *D01F 2/24*      (2006.01)
    *D21H 17/10*     (2006.01)

(52) U.S. Cl.
    CPC ............. *C08B 5/00* (2013.01); *D01F 2/24* (2013.01); *D21H 13/06* (2013.01); *D21H 17/10* (2013.01)

(58) Field of Classification Search
    CPC .......... C08B 5/00; D21H 17/10; D21H 13/06; D01F 2/24
    USPC ........................................................ 536/62
    See application file for complete search history.

(56) References Cited

U.S. PATENT DOCUMENTS

| | | | |
|---|---|---|---|
| 3,250,756 A | 5/1966 | Bergmeister et al. | |
| 3,658,790 A * | 4/1972 | Bernadin | C08B 5/00 604/375 |
| 6,103,790 A | 8/2000 | Cavaille et al. | |
| 6,579,977 B1 | 6/2003 | Pieschel et al. | |
| 8,372,764 B2 | 2/2013 | Yano et al. | |
| 2006/0182941 A1 | 8/2006 | Yano et al. | |
| 2009/0264036 A1 | 10/2009 | Yano et al. | |
| 2009/0305033 A1 | 12/2009 | Yano et al. | |
| 2011/0008638 A1 | 1/2011 | Miyawaki et al. | |
| 2012/0045636 A1* | 2/2012 | Obae | A23L 29/262 428/221 |
| 2013/0005869 A1 | 1/2013 | Yano et al. | |
| 2014/0155589 A1 | 6/2014 | Miyazaki et al. | |
| 2014/0342231 A1 | 11/2014 | Kawasaki et al. | |

FOREIGN PATENT DOCUMENTS

| | | |
|---|---|---|
| CN | 1832985 A | 9/2006 |
| CN | 1871260 A | 11/2006 |
| CN | 1875048 A | 12/2006 |
| CN | 102433786 A | 5/2012 |
| EP | 1 650 253 A1 | 4/2006 |
| EP | 1 679 322 A1 | 7/2006 |
| JP | 4-336797 A | 11/1992 |
| JP | 6-33398 A | 2/1994 |
| JP | 9-31101 A | 2/1997 |
| JP | 9-509694 A | 9/1997 |
| JP | 2008-24778 A | 2/2008 |
| JP | 2008-24788 A | 2/2008 |
| JP | 2009-263848 A | 11/2009 |
| JP | 2010-186124 A | 8/2010 |
| JP | 2011-1559 A | 1/2011 |
| JP | 2011-105799 A | 6/2011 |
| JP | 2011-127067 A | 6/2011 |
| JP | 2011-162608 A | 8/2011 |
| JP | 6414179 B2 | 10/2018 |
| WO | WO-2012119229 A1 * | 9/2012 |
| WO | WO 2013/015307 A1 | 1/2013 |
| WO | WO 2013/073562 A1 | 5/2013 |

OTHER PUBLICATIONS

Saito et al. (Mokuzai Gakkaishi, vol. 38, No. 4, p. 382-385 (1992) (Original Article)).*
The Japanese Notification of Reasons for Refusal, dated Mar. 27, 2018, for corresponding Japanese Application No. 2016-210537, with an English machine translation.
Advisory Action dated Feb. 24, 2020 in U.S. Appl. No. 14/891,255.
Advisory Action dated Jun. 15, 2018 in U.S. Appl. No. 14/891,255.
Canadian Office Action for corresponding Canadian Application No. 2,912,520, dated Apr. 7, 2020.
Chinese Office Action and Search Report for corresponding Chinese Application No. 201710940358.6, dated Nov. 6, 2019.
Chinese Office Action for Chinese Application No. 201480028348.X, dated Oct. 10, 2016, with an English translation of the Office Action.
Extended European Search Report, dated Sep. 16, 2016, for corresponding European Application No. 14797167.5.
Final Office Action dated Jan. 26, 2018 in U.S. Appl. No. 14/891,255.
Final Office Action dated Oct. 25, 2019 in U.S. Appl. No. 14/891,255.

(Continued)

*Primary Examiner* — Layla D Berry
(74) *Attorney, Agent, or Firm* — Birch, Stewart, Kolasch & Birch, LLP (57) ABSTRACT

Objects of the present invention are to provide a phosphoric acid-esterified fine cellulose fiber of which slurry shows superior transparency, and to provide a method for producing a phosphorylated fine cellulose fiber showing superior transparency with good efficiency and high yield. According to the present invention, there is provided a phosphoric acid-esterified fine cellulose fiber, of which 0.2 mass % aqueous dispersion shows a solution haze of 15% or lower.

7 Claims, 3 Drawing Sheets

(56) References Cited

OTHER PUBLICATIONS

International Preliminary Report on Patentability and Written Opinion of the International Searching Authority (Forms PCT/IB/338, PCT/IB/373, PCT/IB/326 and PCT/ISA/237), dated Nov. 26, 2015, for International Application No. PCT/JP2014/063024, with an English translation thereof.
International Search Report (Form PCT/ISA/210), dated Jul. 29, 2014, for International Application No. PCT/JP2014/063024.
Japanese Office Action for Japanese Application No. 2018-181355, dated Jul. 23, 2019.
Korean Office Action dated Feb. 20, 2020, for corresponding Korean Application No. 10-2015-7035355, with English translation.
Korean Office Action dated Oct. 29, 2020, for corresponding Korean Application No. 10-2015-7035355, with English translation.
Non-Final Office Action dated Jan. 14, 2019 in U.S. Appl. No. 14/891,255.
Non-Final Office Action dated Jul. 24, 2020 in U.S. Appl. No. 14/891,255.
Non-Final Office Action dated Jun. 15, 2017 in U.S. Appl. No. 14/891,255.
Notice of Alowance dated Mar. 3, 2021 in U.S. Appl. No. 14/891,255.
Office Action dated Dec. 8, 2020 issued in corresponding Canadian Patent Application No. 2,912,520.
Office Action dated Jan. 12, 2021 issued in corresponding Japanese Patent Application No. 2019-210256 with its English Machine Translation.
Production of cellulose phosphate by Katsuura, phosphoric acid, The Journal of Chemical Industry, Japan, 1996, vol. 69, No. 4, pp. 681 to 685 with its partial English translation.
Restriction Requirement dated Apr. 21, 2017 in U.S. Appl. No. 14/891,255.
Saito et al., "Super absorbent materials prepared from lignocellulosic materials by phosphorylation II", Mokuzai Gakkaishi, vol. 38, No. 4, pp. 382-385, 1992.
Siddiqui et al., "Production and Characterization of Cellulose Nanofibers from Wood Pulp", Journal of Adhesion Science and Technology, (abstract sent), vol. 25 pp. 709-721, 2011.
Japanese Decision of Refusal for corresponding Japanese Application No. 2019-210256, dated Jul. 6, 2021, with an English translation.

* cited by examiner

○ Presence of Urea
● Absence of Urea

[Fig. 5]

PHOSPHORIC ACID-ESTERIFIED FINE CELLULOSE FIBER AND METHOD FOR PRODUCING THE SAME

This application is a Divisional of copending application Ser. No. 14/891,255 filed on Nov. 13, 2015, which is the U.S. National Phase of PCT/JP2014/063024, filed May 16, 2014, and which claims priority under 35 U.S.C. § 119(a) to Application No. 2013-103626 filed in Japan on May 16, 2013, the entire contents of all of which are expressly incorporated by reference into the present application.

TECHNICAL FIELD

The present invention relates to a phosphoric acid-esterified fine cellulose fiber (cellulose nanofiber), which shows higher transparency and maintains higher polymerization degree compared with conventional ones, and a method for efficiently producing the same.

BACKGROUND ART

In recent years, as an alternative to oil resources and in connection with the growing environmental consciousness, materials utilizing reproducible natural fibers attract attentions. Among natural fibers, cellulose fibers having a fiber diameter of 10 to 50 μm, especially such cellulose fibers derived from wood (pulp), have hitherto been widely used mainly for paper products.

As cellulose fibers, fine cellulose fibers having a fiber diameter not larger than 1 μm are also known. In a sheet or composite containing fine cellulose fibers, contact points of fibers markedly increase, and therefore tensile strength of the sheet or composite is markedly improved. Moreover, fiber widths of fine cellulose fibers are smaller than the wavelengths of visible lights, and therefore transparency of the sheet or composite is significantly improved. For example, Patent document 1 discloses a fiber-reinforced composite material that always maintains high transparency without being affected by temperature condition, wavelength etc., and is imparted with various functions by compounding fibers and a matrix material.

Fine cellulose fibers can be produced by subjecting conventional cellulose fibers to a mechanical treatment, but cellulose fibers are strongly binding together through hydrogen bonds. Therefore, if fine cellulose fibers are produced only by simply subjecting fibers to a mechanical treatment, enormous energy is required for obtaining the fine cellulose fibers.

It is well known that it is effective to subject the raw material fibers to a chemical treatment or biological treatment as a pretreatment in addition to the mechanical treatment in order to produce fine cellulose fibers with smaller energy for the mechanical treatment. In particular, if hydrophilic functional groups (for example, carboxy group, cation group, phosphoric acid group, etc.) are introduced into hydroxy groups on the surface of cellulose by a chemical treatment, dispersibility of the fibers in, in particular, an aqueous medium is markedly improved by electric repulsive force of ions and hydration of ions. Therefore, energy efficiency for refining fibers increases compared with the case of not using chemical treatment.

For example, Patent document 2 discloses a method of oxidizing hydroxy groups of cellulose into carboxy groups by TEMPO catalyst oxidation, and then refining the cellulose fibers. Patent document 3 discloses a method of reacting alkali-activated cellulose fibers with a cationizing agent having a quaternary ammonium group and a reactive functional group such as epoxy group to modify hydroxy groups into cationic ether groups, and then refining the cellulose fibers.

Patent documents 4, 5 and 6 disclose techniques concerning fine cellulose fibers in which phosphoric acid groups form esters with hydroxy groups of cellulose. If phosphoric acid groups are introduced into cellulose in the form of ester, they serve as dibasic acid, and therefore it is considered that the electric repulsive force described above becomes stronger compared with a case of introducing a monovalent functional group such as carboxy group and cationic group into cellulose. The inventors of the present invention also examined introduction of phosphoric acid groups into cellulose, and disclosed a method for obtaining fine cellulose fibers with good yield in Patent document 7.

PRIOR ART REFERENCES

Patent Documents

Patent document 1: Japanese Patent Unexamined Publication (KOKAI) No. 2008-24788
Patent document 2: Japanese Patent Unexamined Publication (KOKAI) No. 2009-263848
Patent document 3: Japanese Patent Unexamined Publication (KOKAI) No. 2011-162608
Patent document 4: Japanese Patent Unexamined Publication (KOHYO) No. 9-509694
Patent document 5: Japanese Patent Unexamined Publication (KOKAI) No. 2010-186124
Patent document 6: Japanese Patent Unexamined Publication (KOKAI) No. 2011-001559
Patent document 7: International Patent Publication WO2013/073562

DISCLOSURE OF THE INVENTION

Object to be Achieved by the Invention

However, in the technique described in Patent document 4, fibers are passed through a homogenizer several times to refine the fibers into microfibrils, and then the phosphorylation reaction is performed. That is, it is a technique aiming at giving dispersion stability after the refinement. Efficiency of the refinement is bad, since the fibers are refined before the phosphorylation reaction. Further, since microfibrils are washed after the refinement, load of the washing is heavy. Moreover, it has a problem that if the fibers are refined without introducing phosphoric acid groups, the fibers cannot be fully refined, and the obtained slurry shows poor transparency.

Patent document 5 does not describe specific amounts of regents and reaction conditions, and the effect is also indefinite. In Patent document 6, amounts of urea and phosphoric acid added to plant cell walls etc. are not described. Moreover, Patent document 6 mentions a hydrolysis step using hydrochloric acid as a requirement for completing the phosphorylation. Therefore, it has a problem that there is caused depolymerization of cellulose fibers, which are easily hydrolyzed by an acid, and therefore yield of the fibers and polymerization degree of the fibers are reduced. In Patent document 7, urea or/and a derivative thereof are not used at the time of the reaction, and transparency of the obtained slurry containing fine cellulose fibers must be further improved (details will be explained in comparison of the results shown in Tables 1 and 2 mentioned in the section of Examples).

An object of the present invention is to provide a phosphoric acid-esterified fine cellulose fiber of which slurry shows superior transparency. Another object of the present invention is to provide a method for producing a phosphorylated fine cellulose fiber showing superior transparency with good efficiency and high yield.

Means for Achieving the Object

The inventors of the present invention conducted various researches in order to achieve the aforementioned objects. As a result, they found that, by allowing a compound having a phosphoric acid group or/and a salt thereof to act on a fiber raw material in the presence of urea or/and a derivative thereof, with making amount of phosphoric acid groups to be introduced in one time of the reaction small, and making difference of amounts of strongly acidic groups and weakly acidic groups derived from phosphoric acid groups small in the reaction system, phosphoric acid-esterified fine cellulose fibers showing extremely high transparency could be obtained with a high yield. Further surprisingly, the aforementioned method made it possible to reduce the energy cost required for the refinement compared with conventional methods. The present invention was accomplished on the basis of these findings.

The present invention thus provides the followings.

[1] A phosphoric acid-esterified fine cellulose fiber, of which 0.2 mass % aqueous dispersion shows a solution haze of 15% or lower.

[2] The phosphoric acid-esterified fine cellulose fiber according to [1], which contains 0.6 mmol/g or more of phosphoric acid groups, and wherein difference of introduction amounts of strongly acidic groups and weakly acidic groups derived from phosphoric acid groups introduced into the cellulose is 0.5 mmol/g or smaller.

[3] The phosphoric acid-esterified fine cellulose fiber according to [1] or [2], which has a polymerization degree of 400 or higher as determined by the copper ethylenediamine method.

[4] The phosphoric acid-esterified fine cellulose fiber according to any of [1] to [3], which is produced by a method comprising (a) a step of allowing a compound having a phosphoric acid group or/and a salt thereof to act on a fiber raw material containing cellulose in the presence of urea or/and a derivative thereof to introduce phosphoric acid groups into the fiber raw material, and (b) a step of refining the fiber raw material wherein phosphoric acid groups are introduced in the step (a).

[5] The phosphoric acid-esterified fine cellulose fiber according to [4], wherein yield of the fiber raw material is 70% or higher at the time point that the fiber raw material resulting from the step (a) is subjected to the step (b).

[6] The phosphoric acid-esterified fine cellulose fiber according to [4] or [5], wherein amount of phosphoric acid groups introduced in one time of the phosphoric acid group-introducing reaction in the step (a) is 1.2 mmol/g or smaller.

[7] A method for producing a phosphoric acid-esterified fine cellulose fiber, which comprises (a) a step of allowing a compound having a phosphoric acid group or/and a salt thereof to act on a fiber raw material containing cellulose in the presence of urea or/and a derivative thereof to introduce phosphoric acid groups into the fiber raw material, and (b) a step of refining the fiber raw material wherein phosphoric acid groups are introduced in the step (a), and wherein difference of introduction amounts of strongly acidic groups and weakly acidic groups derived from phosphoric acid groups introduced into the cellulose is made to be 0.5 mmol/g or smaller.

[8] The method for producing a phosphoric acid-esterified fine cellulose fiber according to [7], wherein yield of the fiber raw material is 70% or higher at the time point that the fiber raw material resulting from the step (a) is subjected to the step (b).

[9] The method for producing a phosphoric acid-esterified fine cellulose fiber according to [7] or [8], wherein amount of phosphoric acid groups introduced in one time of the phosphoric acid group-introducing reaction in the step (a) is 1.2 mmol/g or smaller.

[10] The method for producing a phosphoric acid-esterified fine cellulose fiber according to any one of [7] to [9], wherein the phosphoric acid group-introduced fiber raw material to be subjected to the step (b) has 0.6 mmol/g or more of phosphoric acid groups.

Effect of the Invention

The phosphoric acid-esterified fine cellulose fiber of the present invention shows superior transparency. According to the method for producing a phosphoric acid-esterified fine cellulose fiber of the present invention, a phosphorylated fine cellulose fiber showing superior transparency can be efficiently produced with a high yield. According to the method of the present invention, in particular, by making amount of phosphoric acid groups to be introduced in one time of the reaction small, amounts of strongly acidic groups and weakly acidic groups derived from phosphoric acid groups can be made smaller than predetermined levels, and a phosphoric acid-esterified fine cellulose fiber showing superior transparency can be thereby obtained. Moreover, the method for producing a phosphoric acid-esterified fine cellulose fiber of the present invention is a method showing good energy efficiency.

MODES FOR CARRYING OUT THE INVENTION

Hereafter, the present invention will be explained in more detail. The explanations of materials, methods, numerical value ranges, and so forth mentioned in this description are not intended to limit them to the described materials, methods, numerical value ranges, and so forth, and uses of other materials, methods, numerical value ranges, and so forth are not excluded.

<Phosphoric Acid-Esterified Fine Cellulose Fiber>

The phosphoric acid-esterified fine cellulose fiber of the present invention is characterized in that a 0.2 mass % aqueous dispersion thereof shows a solution haze of 15% or lower. It preferably satisfies requirements of containing 0.6 mmol/g or more of phosphoric acid groups, and showing difference of introduction amounts of strongly acidic groups and weakly acidic groups derived from phosphoric acid groups introduced into the cellulose of 0.5 mmol/g or smaller. The aforementioned solution haze of 15% or lower can be thereby attained.

The haze referred to in this description means that defined in JIS Specification K7136, and it can be measured by using, for example, the haze meter produced by Murakami Color Research Laboratory (HM-150), or the like.

The preferred numerical value ranges of the introduction amount of phosphoric acid groups and the difference of introduction amounts of strongly acidic groups and weakly acidic groups derived from phosphoric acid groups, and methods for measuring them will be explained later.

The phosphoric acid-esterified fine cellulose fiber of the present invention preferably has a polymerization degree of 400 or higher, more preferably 500 or higher, particularly preferably 550 or higher, as determined by the copper ethylenediamine method.

The phosphoric acid-esterified fine cellulose fiber of the present invention can be preferably produced by a method comprising the following step (a) and step (b):
(a) the step of allowing a compound having a phosphoric acid group or/and a salt thereof to act on a fiber raw material containing cellulose in the presence of urea or/and a derivative thereof to introduce phosphoric acid groups into the fiber raw material, and
(b) the step of refining the fiber raw material wherein phosphoric acid groups are introduced in the step (a).

This method will be explained later in this description.

A part of hydroxy groups (—OH groups) of the fine cellulose fiber of the present invention are phosphoric acid-esterified. It is a cellulose fiber or rod-like particle of cellulose which is far thinner than pulp fibers usually used for papermaking.

When the minor axis of the fine cellulose fiber is defined as width, the fiber width of the cellulose is, but not particularly limited to, preferably 1 to 1000 nm, more preferably 2 to 500 nm, still more preferably 4 to 100 nm, as observed with an electron microscope. If the fiber width of the fine cellulose fiber is smaller than 1 nm, it is dissolved in water as cellulose molecules, and therefore it no longer exhibits physical properties as fine cellulose fiber (strength, rigidity, and dimensional stability). On the other hand, if it exceeds 1000 nm, such a fiber can no longer be a fine cellulose fiber, and is only a fiber contained in usual pulp, and therefore the physical properties (transparency, strength, rigidity, and dimensional stability) as a fine cellulose fiber cannot be obtained.

Concerning use in which transparency is required for the fine cellulose fiber, if the fiber width exceeds 30 nm, it become close to 1/10 of the wavelengths of visible lights, and when it is compounded with a matrix material, the resultant composite material easily causes refraction at the interfaces and scattering of visible lights, and transparency tends to be degraded. Therefore, although the fiber width is not particularly limited, it is preferably 2 to 30 nm, more preferably 2 to 20 nm. Since a composite obtainable from such a fine cellulose fiber as mentioned above generally has a dense structure, the composite shows high strength, and high modulus of elasticity provided by cellulose crystals. In addition, it also shows high transparency, since it causes little scattering of visible lights.

The fiber width of the fine cellulose fiber is measured by electron microscopy as follows. An aqueous suspension of the fine cellulose fibers at a concentration of 0.05 to 0.1 mass % is prepared, and the suspension is cast on a hydrophilized carbon film-coated grid to prepare a sample for TEM observation. When fibers having a large width are contained, an SEM image of a surface of the suspension cast on glass may be observed. The observation based on an electron microscope image is performed at a magnification of 1000 times, 5000 times, 10000 times, 20000 times, 40000 times, or 50000 times, depending on the width of the constituent fibers. The sample, observation conditions, and magnification are adjusted so that the following requirements (1) and (2) are satisfied.
(1) With a straight line X drawn at an arbitrary position on an observation image, 20 or more fibers intersect.
(2) With a straight line Y drawn on the same image so as to perpendicularly intersect with the straight line X, 20 or more fibers intersect.

On an observation image satisfying the aforementioned requirements, widths of the fibers intersecting with the straight lines X and Y are visually read. In this way, at least three of images of surface portions not overlapping are observed, and widths of fibers intersecting with the straight lines X and Y are read on each image. As described above, widths of at least 20×2×3=120 of fibers are read. The average fiber width of the fine cellulose fibers is an average of the fiber widths read as described above.

When the major axis of the fine cellulose fiber is defined as length, the fiber length is not particularly limited, but it is preferably 0.1 μm or longer. If the fiber length is shorter than 0.1 μm, for example, it becomes difficult to obtain the strength-improving effect at the time of compounding the fine cellulose fiber with a resin. The fiber length can be obtained on the basis of TEM, SEM, or AFM image analysis. The aforementioned fiber length is fiber length of cellulose accounting for 30 mass % or more of the fine cellulose fiber.

Although the range of the fiber length of the fine cellulose fiber is not particularly limited, it is preferably 0.1 to 50 μm, more preferably 0.3 to 30 μm, still more preferably 0.5 to 10 μm.

The axis ratio of the fine cellulose fiber (fiber length/fiber width) is obtained by the following calculation. For each fiber of which fiber width is measured by the aforementioned electron microscopy of the fine cellulose fibers, fiber length is also visually read. The axis ratio (fiber length/fiber width) is calculated for each fiber, and average of the ratios of the observed fibers is considered as the axis ratio of the fine cellulose fiber. The axis ratio of fine cellulose fiber is preferably in the range of 100 to 10000. If the axis ratio is smaller than 100, it may become difficult to form a nonwoven fabric containing fine cellulose fibers. If the axis ratio exceeds 10000, viscosity of the slurry unfavorably increases.

The fine cellulose fiber is an aggregate of cellulose molecules, and has a crystal structure. The crystal structure is the I-form crystal structure (parallel chain).

It can be determined that the fine cellulose fiber has the I-form crystal structure on the basis of typical peaks at two positions around 2θ=14 to 17° and 2θ=22 to 23° in a diffraction profile thereof obtained from a wide angle X-ray diffraction photograph taken by using CuKα (λ=1.5418 Å) monochromatized with graphite.

Although ratio of crystal moieties of the fine cellulose fiber is not particularly limited, if the crystallinity determined by the X-ray diffraction method is 60% or higher, superior performances for exhibiting heat resistance and low linear thermal expansion coefficient are expectable. The crystallinity is obtained in a conventional manner from pattern of an X-ray diffraction profile measured for it (Segal et al., Textile Research Journal, vol. 29, p. 786, 1959).

<Method for Producing Fine Cellulose Fiber>

The method for producing the phosphoric acid-esterified fine cellulose fiber of the present invention comprises (a) a phosphoric acid group-introducing step, and (b) a fibrillation treatment step. One of the characteristics of the method of the present invention is that difference of introduction amounts of strongly acidic groups and weakly acidic groups derived from phosphoric acid groups introduced into the cellulose is made to be 0.5 mmol/g or smaller. The phosphoric acid group-introducing step (a) is a step of allowing a compound having a phosphoric acid group or/and a salt thereof (henceforth referred to as "compound A") to act on a fiber raw material containing cellulose in the presence of urea or/and a derivative thereof (henceforth referred to as "compound B"). Phosphoric acid groups are thereby introduced into hydroxy groups of the cellulose fiber. The fibrillation treatment step (b) is a step of refining the fiber raw material wherein phosphoric acid groups are introduced (henceforth referred to as "phosphoric acid group-introduced cellulose fiber") up to a nano level. The aforementioned treatment steps are performed in the order of the phosphoric acid group-introducing step (a) and the fibrillation treatment step (b). Hereafter, these two steps will be explained.

[Phosphoric Acid Group-Introducing Step (a)]

The phosphoric acid group-introducing step (a) necessarily includes the step of introducing phosphoric acid groups into cellulose, and may include the alkali treatment step, the step of washing excessive reagents off, etc. to be explained later. However, it does not include the step of cleaving a condensed phosphoric acid group.

One example of the method of allowing the compound A to act on the fiber raw material in the presence of the compound B is a method of mixing powder or aqueous solution of the compound A and compound B with a dry or wet fiber raw material. Another example is a method of adding powder or aqueous solution of the compound A and compound B to a slurry of the fiber raw material. Among these methods, a method of adding an aqueous solution of the compound A and compound B to a dry fiber raw material, or a method of adding powder or aqueous solution of the compound A and compound B to a wet fiber raw material is preferred, since they provides highly uniform reaction, but it is not particularly limited. The compound A and compound B may be added simultaneously or separately. The compound A and compound B used for the reaction may be first added as an aqueous solution, and then excessive regent solution may be removed by compression. The fiber raw material is preferably in the form of cotton or thin sheet, but it is not particularly limited.

Examples of the fiber raw material containing cellulose include pulp for papermaking; cotton-based pulp such as those derived from cotton linters and cotton lint; non-wood-based pulp such as those derived from hemp, straw, or bagasse; cellulose isolated from sea squirts or seaweeds, and so forth, but it is not particularly limited. Among these, pulp for papermaking is preferred in view of availability.

Examples of pulp for papermaking include broadleaf tree kraft pulp, conifer kraft pulp, chemical pulp, semi-chemical pulp, mechanical pulp, non-wood-based pulp, and deinking pulp derived from used paper as a raw material, but it is not particularly limited. Examples of the broadleaf tree kraft pulp include leaf bleached kraft pulp (LBKP), leaf unbleached kraft pulp (LUKP), leaf oxygen-bleached kraft pulp (LOKP) etc. Examples of the conifer kraft pulp include needle bleached kraft pulp (NBKP), needle unbleached kraft pulp (NUKP), needle oxygen-bleached kraft pulp (NOKP) etc. Examples of the chemical pulp include sulfite pulp (SP), soda pulp (AP) etc. Examples of the semi-chemical pulp include so-called semi-chemical pulp (SCP), chemiground wood pulp (CGP) etc. Examples of the mechanical pulp include ground wood pulp (GP), thermomechanical pulp (TMP, BCTMP) etc. Examples of the non-wood-based pulp include those derived from paper mulberry, paper birch, hemp, kenaf, etc. as a raw material.

One kind of fiber raw material may be independently used, or two or more kinds of fiber raw materials may be used as a mixture.

Among the aforementioned fiber raw materials, wood-based pulp and deinking pulp are preferred in view of higher availability, but it is not particularly limited. Among wood-based pulps, chemical pulp is particularly preferred, since it contains cellulose at a high ratio, and therefore provides high yield of fine cellulose fibers, and since it shows little decomposition of cellulose in the pulp, and therefore provides fine cellulose fibers as long fibers of a large axis ratio. Among the chemical pulps, kraft pulp or sulphite pulp is most preferably chosen.

Although it is preferable to use pulp for papermaking beaten not so much, it may be beaten with a double disc refiner, single disc refiner, or beater, and it is not particularly limited. As pulp beaten not so much, pulp showing a Canadian Standard Freeness (CSF) of preferably 400 ml or higher, more preferably 500 ml or higher, is preferred. If pulp beaten not so much is used, dehydration and washing performances are improved in the washing of the pulp with water or organic solvent before and after the alkali treatment to be explained later.

The compound A used in the present invention is a compound having a phosphoric acid group or/and a salt thereof.

Examples of the compound having a phosphoric acid group include phosphoric acid, lithium salt of phosphoric acid, sodium salt of phosphoric acid, potassium salt of phosphoric acid, ammonium salt of phosphoric acid, and so forth, but it is not particularly limited. Examples of the lithium salt of phosphoric acid include lithium dihydrogenphosphate, dilithium hydrogenphosphate, trilithium phosphate, lithium pyrophosphate, lithium polyphosphate, and so forth. Examples of the sodium salt of phosphoric acid include sodium dihydrogenphosphate, disodium hydrogenphosphate, trisodium phosphate, sodium pyrophosphate, sodium polyphosphate, and so forth. Examples of the potassium salt of phosphoric acid include potassium dihydrogenphosphate, dipotassium hydrogenphosphate, tripotassium phosphate, potassium pyrophosphate, potassium polyphosphate, and so forth. Examples of the ammonium salt of phosphoric acid include ammonium dihydrogenphosphate, diammonium hydrogenphosphate, triammonium phosphate, ammonium pyrophosphate, ammonium polyphosphate, and so forth.

Among these, phosphoric acid, sodium salt of phosphoric acid, potassium salt of phosphoric acid, and ammonium salt of phosphoric acid are preferred, since they provide high phosphoric acid group introduction efficiency, allow higher improvement in fibrillation efficiency in the fibrillation step to be explained later, requires lower cost, and are more easily industrially used. Although sodium dihydrogenphosphate or disodium hydrogenphosphate is more preferred, it is not particularly limited.

Further, the compound A is preferably used as an aqueous solution, since such a form increases uniformity of the reaction, and efficiency of introduction of phosphoric acid groups, but the form of the compound A is not particularly limited. Although pH of the aqueous solution of the compound A is not particularly limited, it is preferably 7 or lower, since such a solution provides higher efficiency of introduction of phosphoric acid groups, and pH of 3 to 7 is still more preferred in view of suppression of hydrolysis of the pulp fibers. The aforementioned pH value may be attained by, for example, using compounds having phosphoric acid group and showing acidity and alkalinity together, and changing quantitative ratio of them. Alternatively, the aforementioned pH value may be attained by adding an inorganic alkali or organic alkali to a compound having phosphoric acid group and showing acidity.

Although amount of the compound A with respect to the fiber raw material is not particularly limited, if amount of the compound A to be added is represented in terms of amount of phosphorus atoms, amount of phosphorus atoms contained in the compound A with respect to the fiber raw material is preferably 0.5 to 100 mass %, more preferably 1 to 50 mass %, most preferably 2 to 30 mass %. If the amount of phosphorus atoms with respect to the fiber raw material is in the range of 0.5 to 100 mass %, yield of the fine cellulose fibers can be further improved. If the amount of phosphorus atoms to be added to the fiber raw material exceeds 100 mass %, the effect of improving the yield reaches plateau, cost for the compound A to be used increases, and therefore such an amount is not preferred. On the other hand, if the amount of phosphorus atoms with respect to the fiber raw material is lower than 0.5 mass %, sufficient yield is not obtained, and therefore such an amount is not preferred.

Examples of the compound B used in the present invention include urea, thiourea, biuret, phenylurea, benzylurea, dimethylurea, diethylurea, tetramethylurea, benzoyleneurea, hydantoin, and so forth, but it is not particularly limited. Among these, urea is preferred, since it requires low cost, handling thereof is easy, and it easily forms hydrogen bond with a fiber raw material having hydroxyl group.

The compound B is preferably used as an aqueous solution, like the compound A, but the form thereof is not particularly limited. Further, it is preferable to use an aqueous solution dissolving both the compound A and compound B, since such a solution increase uniformity of the reaction, but the present invention is not particularly limited to such an embodiment.

Amount of the compound B with respect to the fiber raw material is preferably 1 to 300 mass %, but it is not particularly limited.

An amide or amine may also be contained in the reaction system in addition to the compound A and compound B. Examples of amide include formamide, dimethylformamide, acetamide, dimethylacetamide, and so forth. Examples of amine include methylamine, ethylamine, trimethylamine, triethylamine, monoethanolamine, diethanolamine, triethanolamine, pyridine, ethylenediamine, hexamethylenediamine, and so forth. It is known that, among these, triethylamine works as an especially favorable reaction catalyst.

Although it is preferable to perform a heat treatment in the step (a), the step (a) is not particularly limited to such an embodiment. Temperature of the heat treatment is chosen to be such a temperature that phosphoric acid groups can be efficiently introduced with suppressing thermolysis and hydrolysis reactions of fibers. Specifically, it is preferably 50 to 250° C., more preferably 100 to 200° C., but it is not particularly limited. For heating, a vacuum drying machine, an infrared heating apparatus, or a microwave heating apparatus may be used.

At the time of the heat treatment, if the fiber raw material is left standing for a long period of time as a fiber raw material slurry containing water and the compound A, water molecules and the dissolving compound A move to the surface of the fiber raw material in connection with advance of drying. Therefore, the concentration of the compound A in the fiber raw material may become uneven, and therefore introduction of phosphoric acid groups into the fiber surface may not uniformly advance. In order to suppress generation of uneven concentration of the compound A in the fiber raw material due to drying, a fiber raw material in the form of an extremely thin sheet may be used, or there may be used a method of performing heat drying or vacuum drying with kneading or/and stirring the fiber raw material and the compound A in a kneader or the like.

As the heating apparatus used for the heat treatment, an oven or the like of ventilationable type that can always discharge the moisture contained in the slurry and moisture produced by the addition reaction of phosphoric acid group etc. to hydroxyl groups of the fiber out of the apparatus system is preferred. If the moisture in the apparatus system is always discharged, the hydrolysis reaction of the phosphoric acid ester bond as the reverse reaction of the phosphoric acid esterification can be suppressed, in addition, acidolysis of the sugar chains in the fiber can also be suppressed, and thus a fine fiber showing a high axis ratio can be obtained.

Although time of the heat treatment depends on the heating temperature, it is preferably 1 to 300 minutes, more preferably 1 to 200 minutes, after moisture is substantially removed from the fiber raw material slurry, but it is not particularly limited.

Although the introduction amount of phosphoric acid groups is not particularly limited, it is preferably 0.1 to 3.8 mmol/g, more preferably 0.2 to 3.0 mmol/g, still more preferably 0.6 to 2.5 mmol/g, per 1 g (mass) of the fine cellulose fiber. If the phosphoric acid group introduction amount is less than 0.1 mmol/g, it is difficult to refine the fiber raw material, and stability of the fine cellulose fiber is degraded. If the phosphoric acid group introduction amount exceeds 3.8 mmol/g, the fine cellulose fiber may be dissolved.

In the phosphoric acid group-introducing step, prolongation of the heating time generally increases amount of phosphoric acid groups that can be introduced, and the amount of phosphoric acid groups introduced by one time of the phosphoric acid group introduction reaction is preferably 1.2 mmol/g or smaller, more preferably 1.0 mmol/g or smaller.

In the phosphoric acid group-introducing step, it is preferable to allow the reaction so that difference of introduction amounts of strongly acidic groups and weakly acidic groups derived from phosphoric acid groups introduced into the cellulose is 0.5 mmol/g or smaller, in order to obtain a highly transparent phosphoric acid-modified fine cellulose fiber. It is more preferable to allow the reaction so that the difference of introduction amounts of strongly acidic groups and weakly acidic groups derived from phosphoric acid groups is 0.3 mmol/g or smaller, particularly preferably 0.2 mmol/g or smaller. If the difference of the introduction amounts of strongly acidic groups and weakly acidic groups is large, the phosphoric acid groups introduced into the cellulose cause condensation, and transparency of the slurry containing fine cellulose fibers refined in the step (b) reduces.

Although it is sufficient that the phosphoric acid group-introducing step is performed once, it may be repeated a plurality of times. In such a case, more phosphoric acid groups are favorably introduced.

Amount of phosphoric acid groups introduced into the fiber raw material is measured by using the conductometric titration method, wherein change of electric conductivity of the slurry containing fine cellulose fibers refined in the step (b) and subjected to a treatment with an ion exchange resin is determined with adding aqueous sodium hydroxide.

In the treatment using an ion exchange resin, a 1/10 volume of a strongly acidic ion exchange resin (for example, Umberjet 1024, already conditioned, ORGANO) is added to the fine cellulose fiber-containing slurry, and the mixture is shaken for 1 hour to perform the treatment. Then, the mixture is poured on a mesh having openings of about 90 μm to separate the resin and the slurry.

Figure 1:
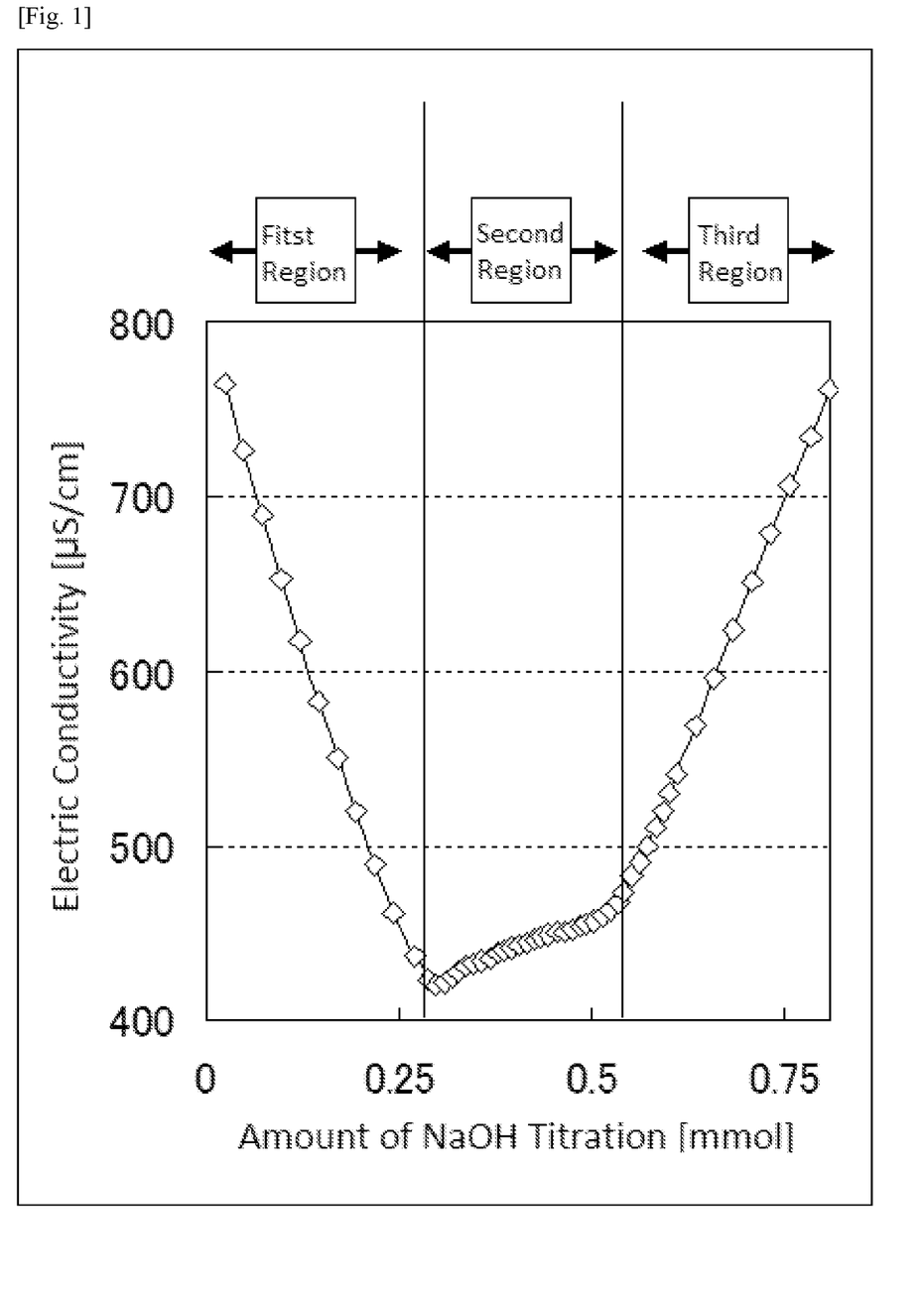
FIG. 1 shows three regions observed in measurement of substituent amount by the conductometric titration method.

In the conductometric titration, if an alkali is continuously added, the curve shown in FIG. 1 is obtained. At first, the electric conductivity sharply reduces (henceforth referred to as "first region"). Then, the conductivity begins to slightly elevate (henceforth referred to as "second region"). Then, increment of the conductivity further increases (henceforth referred to as "third region"). That is, three regions are observed. Among these regions, the amount of alkali required in the first region is equal to the amount of the strongly acidic groups present in the slurry used for the titration, and the amount of alkali required in the second region is equal to the weakly acidic groups present in the slurry used for the titration. If phosphoric acid groups cause condensation, weakly acidic groups are apparently lost, and amount of alkali required in the second region becomes relatively smaller compared with the amount of alkali required in the first region. However, the amount of the strongly acidic groups is equal to the amount of phosphorus atoms irrespective of the condensation, and therefore the simple expression of introduction amount of phosphoric acid groups or introduction amount of substituents means the amount of strongly acidic groups.

[Fibrillation Treatment Step (b)]

In the fibrillation treatment step (b), the phosphoric acid-introduced fibers are fibrillated usually by using a fibrillation apparatus to obtain a slurry containing fine fibers, but the step is not particularly limited to such an embodiment.

As the fibrillation apparatus, high-speed fibrillation machine, grinder (stone mill crusher), high pressure homogenizer, ultra high pressure homogenizer, high pressure impact crusher, ball mill, bead mill, and so forth can be used. As the fibrillation apparatus, wet milling apparatuses such as disk refiner, conical refiner, biaxial kneader, vibration mill, high speed homomixer, ultrasonic disperser, and beater can also be used, but the fibrillation apparatus is not particularly limited to these.

Preferred examples of the fibrillation method include those using a high-speed fibrillation machine, high pressure homogenizer, or ultra high pressure homogenizer, which suffer from less influence of grinding medium, and less risk of contamination, but it is not particularly limited.

At the time of the fibrillation, it is preferable to dilute the fiber raw material wherein phosphoric acid groups are introduced, with water, an organic solvent, or a mixture thereof and make it into slurry, but the fibrillation is not particularly limited. As the dispersion medium, besides water, a polar organic solvent can be used. Preferred examples of the polar organic solvent include alcohol, ketone, ether, dimethyl sulfoxide (DMSO), dimethylformamide (DMF), dimethylacetamide (DMAc), and so forth, but it is not particularly limited. Examples of alcohol include methanol, ethanol, n-propanol, isopropanol, n-butanol, t-butyl alcohol, and so forth. Examples of ketone include acetone, methyl ethyl ketone (MEK), and so forth. Examples of ether include diethyl ether, tetrahydrofuran (THF), and so forth. The dispersion medium may consist of one kind of medium, or two or more kinds of media. In the dispersion medium, solid content other than the fiber raw material such as urea, which shows hydrogen bond-forming property, may be contained.

Although the solid content concentration of the diluted phosphoric acid-introduced fiber is not particularly limited, it is preferably 0.1 to 20 mass %, more preferably 0.5 to 10 mass %. If the solid content concentration of the diluted phosphoric acid-introduced fiber is not lower than 0.1 mass %, the efficiency of the fibrillation is improved, and if the solid content concentration is not higher than 20 mass %, obstruction in the fibrillation apparatus can be prevented.

The fibers in the slurry containing fine cellulose fibers obtained after the step (b) without using any concentration step preferably has a number average fiber width of 1 to 1000 nm, but it is not particularly limited.

The slurry containing fine cellulose fibers obtained after the step (b) without using any concentration step preferably shows a total light transmission of 95% or higher, more preferably 96% or higher, at a solid content concentration of 0.2 mass %, but it is not particularly limited.

The slurry containing fine cellulose fibers obtained after the step (b) without using any concentration step preferably shows a solution haze of 15% or lower, more preferably 10% or lower, at a solid content concentration of 0.2 mass %, but it is not particularly limited.

[Other Treatment Step]

In the present invention, an alkali treatment step is preferably provided between the steps (a) and (b), since yield of the fine fibers is thereby improved. Further, by the alkaline treatment, cations can be supplied to the phosphoric acid groups introduced into the fibers to easily make them into a salt.

The method of the alkaline treatment is not particularly limited, and examples include, for example, a method of immersing the phosphoric acid group-introduced fiber into an alkali solution.

The alkali compound contained in the alkali solution is not particularly limited, and it may be an inorganic alkali compound or an organic alkali compound. Examples of the inorganic alkali compound include hydroxide, carbonate, phosphate of alkali metal, and so forth, but it is not particularly limited. Examples of the hydroxide of alkali metal include lithium hydroxide, sodium hydroxide, and potassium hydroxide, but it is not particularly limited.

Examples of the carbonate of alkali metal include lithium carbonate, lithium hydrogencarbonate, potassium carbonate, potassium hydrogencarbonate, sodium carbonate, and sodium hydrogencarbonate, but it is not particularly limited.

Examples of the phosphate of alkali metal include trilithium phosphate, tripotassium phosphate, trisodium phosphate, disodium hydrogenphosphate, and so forth, but it is not particularly limited.

Examples of the organic alkali compound include ammonia, fatty amine, aromatic amine, fatty ammonium, aromatic ammonium, heterocyclic compound and hydroxide thereof, carbonate, phosphate, and so forth, but it is not particularly limited.

More specifically, examples of the organic alkali compound contained in the alkali solution used in the present invention include, for example, ammonia, hydrazine, methylamine, ethylamine, diethylamine, triethylamine, propylamine, dipropylamine, butylamine, diaminoethane, diaminopropane, diaminobutane, diaminopentane, diaminohexane, cyclohexylamine, aniline, tetramethylammonium hydroxide, tetraethylammonium hydroxide, tetrapropylammonium hydroxide, tetrabutylammonium hydroxide, benzyltrimethylammonium hydroxide, pyridine, N,N-dimethyl-4-aminopyridine, ammonium carbonate, ammonium hydrogencarbonate, diammonium hydrogenphosphate, and so forth, but it is not particularly limited.

The solvent of the alkali solution may be water or an organic solvent, and it is not particularly limited. The solvent is preferably a polar solvent (water or polar organic solvent such as alcohol), and an aqueous solvent containing at least water is more preferred.

As the alkali solution, aqueous sodium hydroxide or aqueous potassium hydroxide is particularly preferred, because of the availability thereof, but it is not particularly limited.

Although pH of the alkali solution at 25° C. in which the phosphoric acid group-introduced cellulose is immersed is not particularly limited, it is preferably 9 to 14, more preferably 10 to 14, still more preferably that 11 to 14. If pH of the alkali solution is 9 or higher, the yield of the fine fiber becomes higher. However, if pH exceeds 14, the handling property of the alkali solution is degraded.

The expression "pH of the alkali solution at 25° C. in which the phosphoric acid group-introduced cellulose is immersed is 9 to 14" used in the present invention means that pH of the alkali solution in which the phosphoric acid group-introduced fibers are immersed is within the aforementioned range at the temperature of 25° C. as the standard. That is, when the alkali solution is prepared at a temperature other than 25° C., the pH range is corrected according such a temperature. Preparation of the alkali solution of which pH is in such a pH range corrected as described above also falls within the scope of the present invention.

Although temperature of the alkali solution used in the alkali treatment step is not particularly limited, it is preferably 5 to 80° C., more preferably 10 to 60° C.

Although time for immersion in the alkali solution performed in the alkali treatment step is not particularly limited, it is preferably 5 to 30 minutes, more preferably 10 to 20 minutes.

Although amount of the alkali solution used in the alkaline treatment is not particularly limited, it is preferably 100 to 100000 mass %, more preferably 1000 to 10000 mass %, with respect to the absolute dry mass of the phosphoric acid-introduced fiber.

In order to reduce the amount of the alkali solution used in the alkali treatment step, the phosphoric acid group-introduced fiber may be washed with water or an organic solvent before the alkali treatment step. After the alkali treatment, it is preferable to wash the alkali-treated phosphoric acid group-introduced fiber with water or an organic solvent before the fibrillation treatment in order to improve the handling property thereof, but it is not particularly limited.

The present invention will be explained in more detail with reference to the following examples. However, the present invention is not limited by these examples.

EXAMPLES

Example 1

<Preparation of Phosphorylation Reagent A>

Urea (30.0 g), sodium dihydrogenphosphate dihydrate (16.6 g), and disodium hydrogenphosphate (12.4 g) were dissolved in water (32.8 g) to prepare a phosphorylation reagent A.

<Production of Fine Cellulose Fibers>

A dried sheet obtained by papermaking using needle bleached kraft pulp was treated with a cutter mill and pin mill to make it into cotton-like fibers. The cotton-like fibers were taken in an amount of 30 g in terms of absolute dry weight, uniformly sprayed with the phosphorylation reagent A, and manually kneaded to obtain a reagent solution-impregnated pulp.

The obtained reagent solution-impregnated pulp was treated by heating for 60 minutes with a blow drying machine with a damper heated at 140° C. to obtain a phosphorylated pulp. At this stage, mass reduction ratio was calculated from the mass reduction relative to the mass observed before the heating.

The obtained phosphorylated pulp was taken in an amount of 3 g in terms of the pulp mass, and a process of pouring 300 ml of ion exchange water to the pulp, stirring the mixture to make it into a uniform dispersion, and dehydrating the dispersion by filtration to obtain a dehydrated sheet was repeated twice. Then, the obtained dehydrated sheet was diluted with 300 ml of ion exchange water, and 1 N aqueous sodium hydroxide was added little by little to the diluted sheet with stirring to obtain a pulp slurry of pH 12 to 13. Then, this pulp slurry was dehydrated to obtain a dehydrated sheet, and then a process of pouring 300 ml of ion exchange water to the sheet, stirring the mixture to make it into a uniform dispersion, and dehydrating the dispersion by filtration to obtain a dehydrated sheet was repeated twice.

Ion exchange water was added to the dehydrated sheet of the phosphorylated pulp obtained after the washing and dehydration, and diluted sheet was stirred to make it into a 0.5 mass % slurry. This slurry was subjected to a fibrillation treatment for 30 minutes under the condition of 21500 revolutions/minute using a fibrillation apparatus (Cleamix 2.2S, M Technique) to obtain fibrillated pulp slurry.

The fine cellulose fiber-containing slurry was centrifuged according to the following description (centrifugation in the section of [Measurement of supernatant yield after centrifugation]), and yield of the fine cellulose fibers was calculated.

Examples 2 to 4

The fine cellulose fiber-containing slurries were obtained in the same manner as that of Example 1 except that the phosphorylated pulp was obtained with changing the heat treatment time in the blow drying machine with a damper heated at 140° C. to 70 minutes (Example 2), 90 minutes (Example 3), or 100 minutes (Example 4).

Comparative Examples 1 to 3

The fine cellulose fiber-containing slurries were obtained in the same manner as that of Example 1 except that the phosphorylated pulp was obtained with changing the heat treatment time in the blow drying machine with a damper heated at 140° C. to 50 minutes (Comparative Example 1), 120 minutes (Comparative Example 2), or 130 minutes (Comparative Example 3).

Reference Example 1

A fibrillated pulp slurry and a fine cellulose fiber-containing slurry were obtained in the same manner as that of Example 1 except that the heat treatment in the blow drying machine with a damper heated at 140° C. was not performed.

Reference Examples 2 to 5

The heat treatment in the blow drying machine with a damper heated at 140° C. was performed in the same manner as that of Example 1 except that the heat treatment time was changed to 5 minutes (Reference Example 2), 10 minutes (Reference Example 3), 15 minutes (Reference Example 4), or 20 minutes (Reference Example 5), and only mass reduction ratio was calculated at the end of the heat treatment.

Reference Example 6

A fibrillated pulp slurry and a fine cellulose fiber-containing slurry were obtained in the same manner as that of Example 1 except that the heat treatment time in the blow drying machine with a damper heated at 140° C. was changed to 30 minutes.

Comparative Example 4

A fibrillated pulp slurry and a fine cellulose fiber-containing slurry were obtained in the same manner as that of Example 1 except that urea was not added to the phosphorylated reagent.

Comparative Examples 5 to 10

Fibrillated pulp slurries and fine cellulose fiber-containing slurries were obtained in the same manner as that of Comparative Example 4 except that the phosphorylated pulp was obtained by a heat treatment in the blow drying machine with a damper heated at 140° C. for 90 minutes (Comparative Example 5), 120 minutes (Comparative Example 6), 180 minutes (Comparative Example 7), 240 minutes (Comparative Example 8), 300 minutes (Comparative Example 9), or 360 minutes (Comparative Example 10).

Reference Examples 7 and 8

The heat treatment in the blow drying machine with a damper heated at 140° C. was performed in the same manner as that of Comparative Example 4 except that the heat treatment time was changed to 10 minutes (Reference Example 7) or 20 minutes (Reference Example 8), and only mass reduction ratio was calculated at the end of the heat treatment.

Reference Example 9

A fibrillated pulp slurry and a fine cellulose fiber-containing slurry were obtained in the same manner as that of Comparative Example 4 except that the heat treatment time in the blow drying machine with a damper heated at 140° C. was changed to 30 minutes.

<Evaluation>

Yields of supernatants of the aforementioned fibrillated pulp slurries obtained after the centrifugation were measured by the method described below. The yield of supernatant obtained after centrifugation serves as an index of the yield of fine cellulose fibers, and a higher supernatant yield means a higher yield of fine cellulose fibers.

[Measurement of Supernatant Yield after Centrifugation]

Ion exchange water was added to the fibrillated pulp slurry to adjust the solid content concentration of the slurry to 0.2 mass %, and the slurry was centrifuged at 12000 G for 10 minutes by using a cooling high-speed centrifugation machine (H-2000B, Kokusan). The obtained supernatant was collected, and solid content concentration of the supernatant was measured. Yield of fine cellulose fibers was obtained in accordance with the following equation.

Yield of fine cellulose fibers (%)=Solid content concentration of supernatant/0.2 mass %×100

[Transmission Electron Microscopy]

The supernatant of the fibrillated pulp slurry was diluted to a concentration of 0.01 to 0.1 mass % with water, and dropped onto a hydrophilized carbon grid film. After drying, dried supernatant was stained with uranyl acetate, and observed with a transmission electron microscope (JEOL-2000EX, JEOL). It was thereby confirmed that fine cellulose fibers having a width of about 4 nm were obtained in Examples 1 to 4, Comparative Examples 1 to 10, and Reference Examples 1, 6, and 9.

[Haze of Fibrillation Liquor]

Haze is an index of transparency of the fine cellulose fiber-containing slurry, and a lower haze value means higher transparency. As for the measurement of haze, the fine cellulose fiber-containing slurry obtained after the step (b), as it was, was diluted with ion exchange water to a solid content concentration of 0.2 mass %, and haze of the diluted slurry was measured according to JIS K7136 by using a haze meter (HM-150) produced by Murakami Color Research Laboratory.

[Total Light Transmission of Fibrillation Liquor]

Total light transmission is an index of transparency of fine cellulose fiber-containing slurry, like the haze, and a higher total light transmission means higher transparency. As for the measurement of the total light transmission, the fine cellulose fiber-containing slurry obtained after the step (b), as it was, was diluted with ion exchange water to a solid content concentration of 0.2 mass %, and total light transmission of the diluted slurry was measured according to JIS K7136 by using a haze meter (HM-150) produced by Murakami Color Research Laboratory.

[Amount of Introduced Substituents]

Amount of introduced substituents is amount of phosphoric acid groups introduced into the fiber raw material, and a larger value of the amount means introduction of more phosphoric acid groups. As for the measurement of the amount of introduced substituents, the fine cellulose fiber-containing slurry obtained after the step (b), as it was, was diluted with ion exchange water to a solid content concentration of 0.2 mass %, and treated with ion exchange resin, and the amount was measured by titration using an alkali. In the treatment with ion exchange resin, a 1/10 volume of strongly acidic ion exchange resin (Umberjet 1024, already conditioned, ORGANO) was added to the 0.2 mass % fine cellulose fiber-containing slurry, and the mixture was shaken for 1 hour. Then, the mixture was poured on a mesh having openings of 90 µm to separate the resin and the slurry. In the titration using an alkali, change of the value of electric conductivity of the ion-exchanged fine cellulose fiber-containing slurry was measured with adding 0.1 N aqueous sodium hydroxide to the slurry.

That is, the amount (mmol) of alkali required for the titration in the first region of the curve shown in FIG. 1 was divided with the solid content (g) in the slurry as the object of the titration to obtain the amount of introduced substituents (mmol/g).

Figure 2:
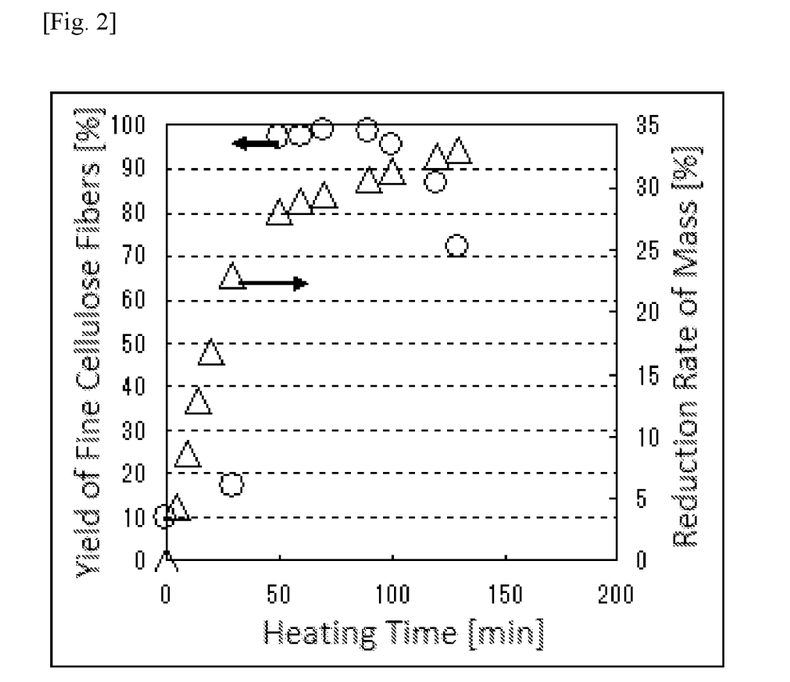
FIG. 2 shows the relation of heating time, reduction rate of mass, and yield of fine cellulose fibers observed when the phosphorylation reaction was performed in the presence of urea.

Heating times, mass reduction ratios, yields of fine cellulose fibers, hazes of fibrillation liquor, total light transmissions of fibrillation liquor, and amounts of introduced substituents used or observed in Examples 1 to 4, Comparative Examples 1 to 3, and Reference Examples 1 to 6 are shown in Table 1 and FIG. 2.

Figure 3:
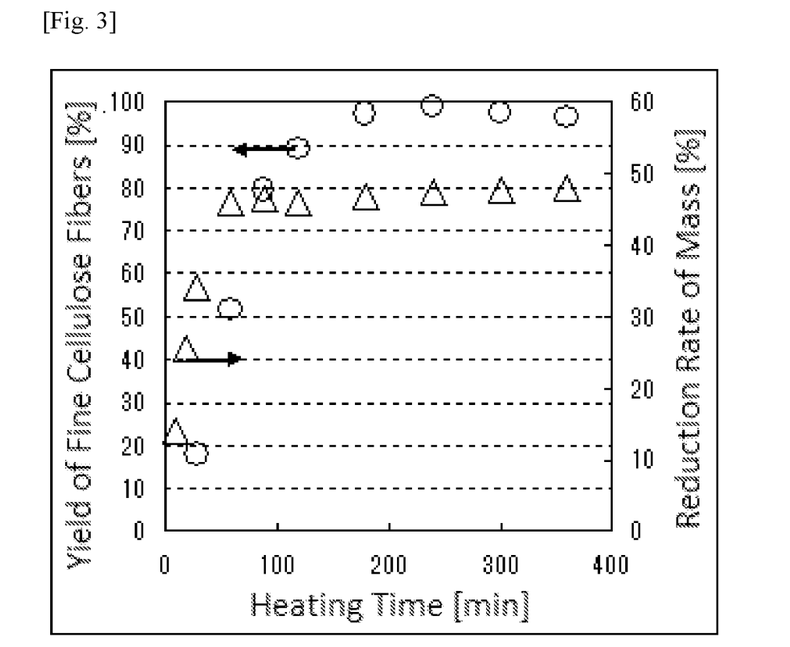
FIG. 3 shows the relation of heating time, reduction rate of mass, and yield of fine cellulose fibers observed when the phosphorylation reaction was performed in the absence of urea.

Heating times, mass reduction ratios, yields of fine cellulose fibers, hazes of fibrillation liquor, total light transmissions of fibrillation liquor, and amounts of introduced substituents used or observed in Comparative Examples 4 to 10 and Reference Examples 7 to 9 are shown in Table 2 and FIG. 3.

TABLE 1

| | With addition of Urea | | | | | |
|---|---|---|---|---|---|---|
| | Heating time [min] | Mass reduction ratio [%] | Yield of fine cellulose fibers [%] | Haze of fibrillation liquor [%] | Total light transmission of fibrillation liquor [%] | Amount of introduced substituents (amount of strongly acidic groups [mmol/g] |
| Reference Example 1 | 0 | 0 | 10 | | | |
| Reference Example 2 | 5 | 4 | | | | |
| Reference Example 3 | 10 | 9 | | | | |
| Reference Example 4 | 15 | 13 | | | | |
| Reference Example 5 | 20 | 17 | | | | |
| Reference Example 6 | 30 | 23 | 17 | | | |
| Comparative Example 1 | 50 | 28 | 97 | 43 | 92.2 | 0.42 |
| Example 1 | 60 | 29 | 98 | 15 | 97.5 | 0.70 |
| Example 2 | 70 | 30 | 99 | 10 | 98.3 | 0.71 |
| Example 3 | 90 | 31 | 99 | 6 | 99 | 0.87 |
| Example 4 | 100 | 31 | 95 | 5 | 99 | 0.90 |
| Comparative Example 2 | 120 | 33 | 87 | 41 | 96.7 | 1.26 |
| Comparative Example 3 | 130 | 33 | 72 | 68 | 94.3 | 1.40 |

TABLE 2

| | No addition of urea | | | | | |
|---|---|---|---|---|---|---|
| | Heating time [min] | Mass reduction ratio [%] | Yield of fine cellulose fibers [%] | Haze of fibrillation liquor [%] | Total light transmission of fibrillation liquor [%] | Amount of introduced substituents (amount of strongly acidic groups [mmol/g] |
| Reference Example 7 | 10 | 14 | | | | |
| Reference Example 8 | 20 | 25 | | | | |
| Reference Example 9 | 30 | 34 | 18 | | | |
| Comparative Example 4 | 60 | 46 | 52 | | | 0.15 |
| Comparative Example 5 | 90 | 47 | 79 | | | 0.29 |
| Comparative Example 6 | 120 | 46 | 89 | 49.6 | 91.1 | 0.34 |
| Comparative Example 7 | 180 | 47 | 97 | 33.1 | 94.9 | 0.52 |
| Comparative Example 8 | 240 | 47 | 99 | 24 | 96 | 0.64 |
| Comparative Example 9 | 300 | 48 | 98 | 20.6 | 96.7 | 0.73 |
| Comparative Example 10 | 360 | 48 | 96 | 21.5 | 96.7 | 0.77 |

First, the effect of the presence or absence of urea on the production of fine cellulose fibers will be discussed.

From the mass reduction ratios and yields of fine cellulose fibers shown in FIGS. 2 and 3, it can be seen that the yield of fine cellulose fibers began to increase, and the haze began to reduce (transparency began to increase) after the time point that there was started heating under the state that moisture in the system had been removed by heating, and thus there was substantially no moisture.

In FIG. 2, the mass reduction ratio increases even after the inflexion point in contrast to that of FIG. 3, and this is because urea decomposed at high temperature. It is known that urea melts and decomposes at 130 to 135° C. It is also known that urea hardly decomposes in a state of aqueous solution.

Therefore, it can be considered that, in the graph of the mass reduction ratio shown in FIG. 2, the first inclination was formed by evaporation of the moisture in the system, and the second inclination was formed mainly by decomposition of urea.

It is common to FIGS. 2 and 3 that water was removed from the inside of the system at the time point of the heating time of about 40 minutes.

Figure 4:
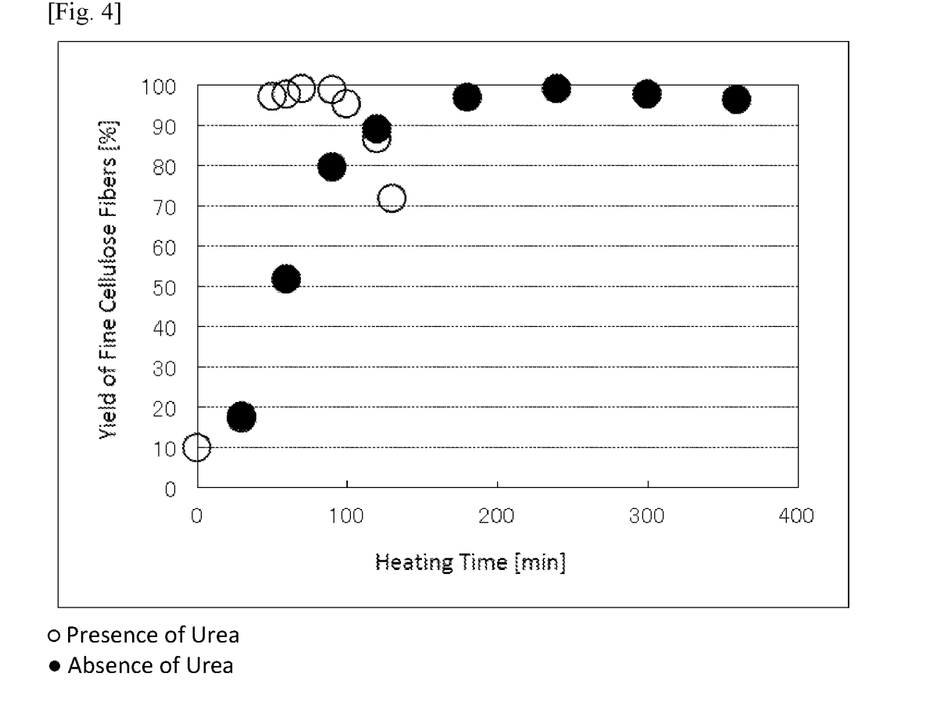
FIG. 4 shows the relation of heating time, and yield of fine cellulose fibers observed when the phosphorylation reaction is performed in the presence or absence of urea.

In comparison of the cases of using urea and not using urea shown in FIG. 4, when urea was added, the yield of fine cellulose fibers immediately improved in contrast to the case of not adding urea, but with increase of the heating time, the yield of fine cellulose fibers reduced, and the transparency of the obtained slurry containing the fine cellulose fibers markedly reduced.

Under the condition of not adding urea, marked reduction of the yield of fine cellulose fibers or transparency of the slurry was not seen.

From the results shown in Table 1 and 2, it can be seen that fine cellulose fiber slurry showing high yield of fine cellulose fibers and high transparency (haze of the fibrillation liquor was 15% or lower as a 0.2 mass % slurry) was obtained only under the condition of adding urea. See to the yields of fine cellulose fiber and haze values of fibrillation liquor observed in Examples 1 to 4 mentioned in Table 1.

That is, when urea was not added, marked reduction of transparency of the slurry was not seen even with a prolonged heating time, but slurry with extremely high transparency could not be obtained. On the other hand, when urea was added, slurry of extremely high transparency could be obtained, but a prolonged heating invited marked reduction of transparency.

That is, in order to obtain a fine cellulose fiber-containing slurry showing extremely high transparency, it is necessary to advance the phosphoric acid-esterification under the optimal conditions with adding urea.

One of the objects of the present invention is to obtain a fine cellulose fiber slurry with higher transparency. For achieving this object, it is preferable to make the amount of substituents introduced by one time of the phosphorylation reaction to be 1.2 mmol/g or smaller in a reaction system where urea is added, and it is preferred that the amount of finally introduced phosphoric acid groups is 0.6 mmol/g or larger.

Preparation Example 1

As conifer kraft pulp, pulp produced by Oji Paper (solid content 93 mass %, in the form of sheet having grams per square meter of 208 g/m$^2$, and Canadian Standard Freeness (CSF) of 700 ml as measured according to JIS P8121 as macerated pulp) was used. Into 100 mass parts as absolute dry mass of the aforementioned conifer kraft pulp, a mixed aqueous solution of ammonium dihydrogenphosphate and urea was impregnated, and the sheet was compressed so that the sheet contained 56 mass parts of ammonium dihydrogenphosphate and 150 mass parts of urea to obtain regent solution-impregnated pulp.

The obtained regent solution-impregnated pulp was dried with a dryer at 105° C. to evaporate moisture as pre-drying. Then, with a blow drying machine set at 140° C., the sheet was heated for 4 minutes to introduce phosphoric acid groups into cellulose in the pulp.

A process of pouring 10000 mass parts of ion exchange water on 100 mass parts of the obtained phosphorylated pulp, stirring the mixture to form a uniform dispersion, and performing dehydration by filtration to obtain a dehydrated sheet was repeated twice. Subsequently, the obtained dehydrated sheet was diluted with 10000 mass parts of ion exchange water, and 1 N aqueous sodium hydroxide was added little by little to the diluted sheet with stirring to obtain a pulp slurry of pH 12 to 13. Then, this pulp slurry was dehydrated to obtain a dehydrated sheet, and then a process of pouring 10000 mass parts of ion exchange water on the pulp, stirring the mixture to make it into a uniform dispersion, and dehydrating the dispersion by filtration to obtain a dehydrated sheet was repeated twice to obtain a dehydrated sheet of phosphorylated pulp.

Preparation Examples 2 to 5

Dehydrated sheets of phosphorylated pulp were obtained in the same manner as that of Preparation Example 1 except that the time of heating with a blow drying machine set at 140° C. was changed to 6.5 minutes (Preparation Example 2), 10 minutes (Preparation Example 3), 15 minutes (Preparation Example 4), or 30 minutes (Preparation Example 5).

Preparation Example 6

A dehydrated sheet of phosphorylated pulp was obtained in the same manner as that of Preparation Example 3 except that the dehydrated sheet of phosphorylated pulp obtained in Preparation Example 3 was used as the starting material, and the step of introducing phosphoric acid groups was further repeated 3 times (phosphorylation was performed 4 times in total).

Example 5

Ion exchange water was added to the dehydrated sheet of the phosphorylated pulp obtained in Preparation Example 3, and then the mixture was stirred to form a 0.5 mass slurry. This slurry was subjected to a fibrillation treatment for 1, 3, 7, 15 or 30 minutes under the condition of 21500 revolutions/minute using a fibrillation apparatus (Cleamix 2.2S, M Technique), and the haze of the fine cellulose fiber-containing slurry obtained with each fibrillation time was measured by the method described above. Further, introduction amounts of strongly acidic groups and weakly acidic group derived from the phosphoric acid groups introduced into cellulose were calculated.

[Introduction Amounts of Strongly Acidic Groups and Weakly Acidic Groups Derived from Phosphoric Acid Groups]

The difference of the introduction amounts of the strongly acidic groups and weakly acidic groups derived from phosphoric acid groups serves as an index of condensation of phosphoric acid groups. A smaller value of the difference means less condensation of phosphoric acid groups, and gives a fine cellulose fiber-containing slurry of higher transparency. Introduction amounts of strongly acidic groups and weakly acidic groups derived from phosphoric acid groups were measured by titration using an alkali for the fine cellulose fiber-containing slurry obtained by diluting the slurry obtained after the step (b) as it was to a solid content concentration of 0.2 mass % with ion exchange water and subjecting the slurry to a treatment with ion exchange resin. In the treatment with ion exchange resin, a 1/10 volume of strongly acidic ion exchange resin (Umberjet 1024, already conditioned, ORGANO) was added to the 0.2 mass % fine cellulose fiber-containing slurry, and the mixture was shaken for 1 hour. Then, it was poured on a mesh having openings of 90 μm to separate the resin and the slurry. In the titration using an alkali, change of the value of electric conductivity of the ion-exchanged fine cellulose fiber-containing slurry was measured, with adding 0.1 N aqueous sodium hydroxide to the slurry.

That is, the amount (mmol) of the alkali required in the first region of the curve shown in FIG. 1 was divided with the solid content (g) in the slurry as the object of the titration to obtain introduction amount of strongly acidic groups (mmol/g).

Further, the amount (mmol) of the alkali required in the second region of the curve shown in FIG. 1 was divided with the solid content (g) in the slurry as the object of the titration to obtain introduction amount of weakly acidic groups (mmol/g).

Example 6

Haze of a fine cellulose fiber-containing slurry was measured in the same manner as that of Example 5 except that the dehydrated sheet of phosphorylated pulp obtained in Preparation Example 4 was used. Further, introduction amounts of strongly acidic groups and weakly acidic groups derived from phosphoric acid groups introduced into the cellulose were calculated.

Example 7

Haze of a fine cellulose fiber-containing slurry was measured in the same manner as that of Example 5 except that the dehydrated sheet of phosphorylated pulp obtained in Preparation Example 6 was used. Further, introduction amounts of strongly acidic groups and weakly acidic groups derived from phosphoric acid groups introduced into the cellulose were calculated.

Comparative Example 11

Haze of a fine cellulose fiber-containing slurry was measured in the same manner as that of Example 5 except that unphosphorylated conifer kraft pulp was used. Further, introduction amounts of strongly acidic groups and weakly acidic groups derived from phosphoric acid groups introduced into the cellulose were calculated.

Comparative Example 12

Haze of a fine cellulose fiber-containing slurry was measured in the same manner as that of Example 5 except that the dehydrated sheet of phosphorylated pulp obtained in Preparation Example 1 was used. Further, introduction amounts of strongly acidic groups and weakly acidic groups derived from phosphoric acid groups introduced into the cellulose were calculated.

Comparative Example 13

Haze of a fine cellulose fiber-containing slurry was measured in the same manner as that of Example 5 except that the dehydrated sheet of phosphorylated pulp obtained in Preparation Example 2 was used. Further, introduction amounts of strongly acidic groups and weakly acidic groups derived from phosphoric acid groups introduced into the cellulose were calculated.

Comparative Example 14

Haze of a fine cellulose fiber-containing slurry was measured in the same manner as that of Example 5 except that the dehydrated sheet of phosphorylated pulp obtained in Preparation Example 5 was used. Further, introduction amounts of strongly acidic groups and weakly acidic groups derived from phosphoric acid groups introduced into the cellulose were calculated.

Figure 5:
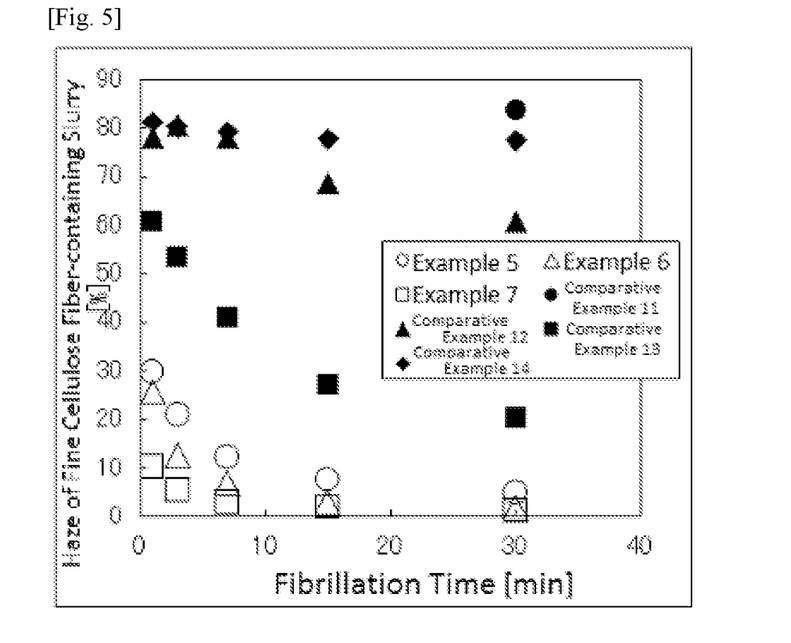
FIG. 5 shows the relation of introduction amount of phosphoric acid groups, fibrillation time, and haze (transparency) of fine cellulose fiber-containing slurry.

The haze values of the fine cellulose fiber-containing slurries measured in Examples 5 to 7 and Comparative Examples 11 to 14 are shown in Table 3 and FIG. 5 in connection with the introduction amounts of phosphoric acid groups and the fibrillation times (refining times).

TABLE 3

| | | | Haze of fine cellulose fiber-containing slurry (0.2 mass % aqueous dispersion) | | | | | |
|---|---|---|---|---|---|---|---|---|
| Preparation Example / Example or Comparative Example | | — / Comparative Example 11 | Preparation Example 1 / Comparative Example 12 | Preparation Example 2 / Comparative Example 13 | Preparation Example 3 / Example 5 | Preparation Example 4 / Example 6 | Preparation Example 5 / Comparative Example 14 | Preparation Example 6 / Example 7 |
| Number of phosphorylation [time] | | 0 | | | 1 | | | 4 |
| Introduction amount of phosphoric acid groups [mmol/g] | Strongly acidic group | 0.0 | 0.27 | 0.57 | 0.74 | 0.93 | 1.58 | 1.62 |
| | Weakly acidic group | 0.0 | 0.27 | 0.57 | 0.74 | 0.92 | 0.93 | 1.60 |
| Fibrillation time [min] | 1 | | 78.1 | 60.6 | 29.8 | 25.7 | 81.2 | 10.3 |
| | 3 | | 80.4 | 53.3 | 21.1 | 12.4 | 80.3 | 5.4 |
| | 7 | | 77.9 | 41 | 12.3 | 6.8 | 79.1 | 2.9 |
| | 15 | | 68.7 | 27 | 7.6 | 3.0 | 77.7 | 1.9 |
| | 30 | 83.6 | 60.7 | 20.3 | 4.9 | 1.8 | 77.5 | 1.2 |
| | 120 | 79.4 | | | | | | |
| | 240 | 71.3 | | | | | | |
| | 3000 | 45.6 | | | | | | |

In Examples 5 to 7, in which preferred phosphoric acid group introduction conditions were used, highly transparent slurries showing a haze lower than 15% could be obtained. Further, as clearly seen from the graph shown in FIG. 5, the time required for the haze to come to be lower than 15% was also very short.

Therefore, the conditions with which highly transparent slurry can be finally obtained also have an effect of reducing mechanical energy required for obtaining such highly transparent slurry.

On the other hand, in Comparative Examples 11 to 14, in which the phosphoric acid group introduction conditions were not preferred conditions, the haze value became high, and the transparency was not sufficient. Further, the improvement of transparency by prolongation of the fibrillation time is also small, and the efficiency for obtaining fine cellulose fibers was bad.

In particular, with the non-modification condition (Comparative Example 11), even when the fibrillation time was extended by 100 times, the result was inferior to those obtained with the conditions of the examples.

Comparative Example 15

To the dehydrated sheet of the phosphorylated pulp obtained in Preparation Example 5, 3 mass % hydrochloric acid was added to prepare a slurry having a pulp concentration of 1 mass %, and then hydrolysis reaction was allowed for 2 hours with stirring under the condition of 60° C. The pulp obtained after the hydrolysis reaction was fully washed with ion exchange water, then the pulp concentration thereof was adjusted to 1 mass % by adding 3 mass % aqueous sodium carbonate, and the pulp was left standing for 20 minutes with stirring. The pulp obtained after the sodium carbonate treatment was fully washed with ion exchange water, and a dehydrated sheet of the hydrolyzed phosphorylated pulp was obtained.

Ion exchange water was added to the dehydrated sheet, and the diluted sheet was stirred to make it into a 0.5 mass % slurry. This slurry was subjected to a fibrillation treatment for 30 minutes under the condition of 21500 revolutions/minute using a fibrillation apparatus (Cleamix 2.2S, M Technique), and haze of the obtained fine cellulose fiber-containing slurry was measured.

Amounts of strongly acidic groups and weakly acidic group, solution hazes of fine cellulose fiber-containing slurries, yields of the fiber raw material, and polymerization degrees [-] observed in Example 6 (fibrillation time, 30 minutes), Comparative Example 14 (fibrillation time, 30 minutes), and Comparative Example 15 are shown in Table 4. The polymerization degree and the yield of the fiber raw material were measured by the following methods.

[Measurement of Polymerization Degree of Fine Cellulose Fiber]

As fine cellulose fibers, supernatant obtained after centrifugation and having a concentration of about 0.5 mass % is developed on a polytetrafluoroethylene petri dish and dried at 60° C. to obtain a dry sheet. The obtained dry sheet is dispersed in a dispersion medium, and viscosity of the pulp is measured according to Tappi T230. Further, viscosity of the dispersion medium alone is also measured as a blank test to obtain blank viscosity. Specific viscosity (qsp) is calculated by subtracting 1 from a numerical value obtained by dividing the viscosity of pulp by the blank viscosity, and intrinsic viscosity (Nl) is calculated in accordance with the following equation.

$$[\eta]=\eta sp/(c(1+0.28\times\eta sp))$$

The symbol c in the equation represents the cellulose concentration at the time of the viscosity measurement.

Then, the polymerization degree (DP) referred to in the present invention is calculated in accordance with the following equation.

$$DP=1.75\times[\eta]$$

Since this polymerization degree is an average polymerization degree measured by the viscosity method, it may be also called "viscosity average polymerization degree".

[Yield of Fiber Raw Material]

The yield of the fiber raw material means yield of the fiber raw material used in the step (a) at the time of being used in the step (b), and it was calculated in accordance with the following equation.

$$(Yield)=\alpha/\beta\times 100[\%]$$

In the equation, α is the absolute dry mass of the phosphoric acid-esterified fiber raw material used in the step (b), and β is the absolute dry mass of the fiber raw material before being used in the step (a) required for obtaining the mass α.

For example, if the yield of the fiber raw material is 80%, in order to obtain an absolute dry mass α of 80 g of phosphoric acid-esterified fiber raw material, it is necessary to use an absolute dry mass β of 100 g of the fiber raw material in the step (a).

TABLE 4

| No. | Fibrillation time [min] | Hydrolysis treatment | Amount of phosphoric acid groups (CNF fibrillation liquor) | | Solution haze [%] | Yield of fiber raw material [%] | Polymerization degree [-] |
|---|---|---|---|---|---|---|---|
| | | | Strongly acidic group [mmol/g] | Weakly acidic group [mmol/g] | | | |
| Example 6 | 30 | Not used | 0.93 | 0.92 | 1.8 | 94 | 585 |
| Comparative Example 14 | 30 | Not used | 1.58 | 0.93 | 77.5 | 91 | (Not dissolved) |
| Comparative Example 15 | 30 | Used | 1.05 | 1.05 | 1.4 | 62 | 360 |

It is considered that the reduction of the transparency observed in Comparative Examples 2, 3, and 14 related to condensation of the phosphoric acid groups introduced into the cellulose. In fact, in Comparative Example 14, the difference of the amounts of strongly acidic groups and weakly acidic groups exceeded 0.5 mmol/g, and it is considered that there was condensation.

It is known that such condensation can be cleaved by an acid treatment. Actually, in Comparative Example 15, by cleaving condensation by an acid treatment, the difference of the amounts of strongly acidic groups and weakly acidic groups was made to be lower than 0.5 mmol/g, and transparency was recovered. However, since the chains of cellulose molecules themselves were hydrolyzed with the acid, the yield was markedly reduced after the acid treatment, and the polymerization degree of the cellulose also reduced. Further, since a part of the introduced phosphoric acid groups were lost together with the monosaccharides cleaved by the hydrolysis, the amount of phosphoric acid groups (amount of strongly acidic groups) reduced.

The invention claimed is:

1. A phosphoric acid-esterified fine cellulose fiber, of which 0.2 mass % aqueous dispersion shows a solution haze of 15% or lower, and which contains 0.6 mmol/g to 3.8 mmol/g of strongly acidic group derived from phosphoric acid groups.

2. The phosphoric acid-esterified fine cellulose fiber according to claim 1, which is prepared by a method comprising (a) a step of allowing a compound having a phosphoric acid group or/and a salt thereof to act on a fiber raw material containing cellulose in the presence of urea or/and a derivative thereof to introduce phosphoric acid groups into the fiber raw material, and (b) a step of refining the fiber raw material of step (a) wherein phosphoric acid groups have been introduced by step (a), and wherein strongly acidic groups and weakly acidic groups of the phosphoric acid groups are introduced into the cellulose, and wherein a difference between an amount of strongly acidic groups in the cellulose and an amount of weakly acidic groups in the cellulose is made to be 0.5 mmol/g or smaller.

3. The phosphoric acid-esterified fine cellulose fiber according to claim 1, which has a polymerization degree of 400 or higher as determined by the copper ethylenediamine method.

4. A phosphoric acid-esterified fine cellulose fiber, which contains 0.6 mmol/g or more of phosphoric acid groups, which is prepared by a method comprising (a) a step of allowing a compound having a phosphoric acid group or/and a salt thereof to act on a fiber raw material containing cellulose in the presence of urea or/and a derivative thereof to introduce phosphoric acid groups into the fiber raw material, and (b) a step of refining the fiber raw material of step (a) wherein phosphoric acid groups have been introduced by step (a), and wherein strongly acidic groups and weakly acidic groups of the phosphoric acid groups are introduced into the cellulose, and wherein a difference between an amount of strongly acidic groups in the cellulose and an amount of weakly acidic groups in the cellulose is made to be 0.5 mmol/g or smaller; and
    wherein the phosphoric acid-esterified fine cellulose fiber has a polymerization degree of 400 or higher as determined by the copper ethylenediamine method.

5. The phosphoric acid-esterified fine cellulose fiber according to claim 4, wherein a yield of fine cellulose fibers which is determined after step (b) by the following measurement method is 95% or higher:
    wherein ion exchange water is added to the phosphoric acid-esterified fine cellulose fiber to obtain a slurry of solid content of 0.2 mass %, and the slurry is centrifuged at 12000 G for 10 minutes by using a cooling high-speed centrifugation machine, and the obtained supernatant is collected, and solid content concentration of the supernatant is measured, and then yield is obtained in accordance with the following equation:

Yield of fine cellulose fibers (%)=Solid content concentration of supernatant/0.2×100.

6. A phosphoric acid-esterified fine cellulose fiber, which contains 0.6 mmol/g or more of phosphoric acid groups, and has a polymerization degree of 400 or higher as determined by the copper ethylenediamine method.

7. The phosphoric acid-esterified fine cellulose fiber according to claim 6, of which 0.2 mass % aqueous dispersion shows a solution haze of 15% or lower.

* * * * *